(12) United States Patent
Gaines et al.

(10) Patent No.: US 12,270,479 B2
(45) Date of Patent: Apr. 8, 2025

(54) INFLATABLE OBJECT AND VALVE THEREFOR

(71) Applicant: SPIN MASTER, INC., Williamsville, NY (US)

(72) Inventors: C. Latham Gaines, Nashville, TN (US); Stephen C. Graner, Cranford, NJ (US)

(73) Assignee: SPIN MASTER, INC., Williamsville, NY (US)

( * ) Notice: Subject to any disclaimer, the term of this patent is extended or adjusted under 35 U.S.C. 154(b) by 0 days.

(21) Appl. No.: 18/487,735

(22) Filed: Oct. 16, 2023

(65) Prior Publication Data

US 2024/0044414 A1 Feb. 8, 2024

Related U.S. Application Data (63) Continuation of application No. 18/148,117, filed on Dec. 29, 2022, now Pat. No. 11,808,368, which is a
(Continued)

(51) Int. Cl.
  *F16K 15/20* (2006.01)
  *F16K 15/03* (2006.01)
  *F16K 15/14* (2006.01)

(52) U.S. Cl.
  CPC .......... *F16K 15/202* (2013.01); *F16K 15/031* (2013.01); *F16K 15/148* (2013.01); *F16K 15/205* (2013.01)

(58) Field of Classification Search
  CPC ...... F16K 15/148; F16K 15/20; F16K 15/202; F16K 15/205; Y10T 137/3584; Y10T 137/374; Y10T 137/3755
  See application file for complete search history.

(56) References Cited

U.S. PATENT DOCUMENTS

| | | | |
|---|---|---|---|
| 5,343,889 A | * | 9/1994 | Jaw ........................ F16K 15/205 137/232 |
| D406,238 S | | 3/1999 | Voller |

(Continued)

FOREIGN PATENT DOCUMENTS

| | | |
|---|---|---|
| CN | 101158292 A | 4/2008 |
| CN | 103912360 A | 7/2014 |

(Continued)

OTHER PUBLICATIONS

Swimways, available in facebook.com, announced Feb. 2, 2022 [online], [site visited Dec. 27, 2023], Internet URL: https://m.facebook.com/swimways/videos/no-more-hassle-inflating-your-pool-floats-with-swimways-hyper-flate-valve-techno/654146152561581/ (Year: 2022).
(Continued)

*Primary Examiner* — Kevin F Murphy
(74) *Attorney, Agent, or Firm* — Aird & McBurney LP (57) ABSTRACT

In an aspect, an inflatable object includes an object body enclosing a chamber to receive air, and a valve mounted to the inflatable object body, including a valve body defining a passageway between the chamber and an ambient environment. The valve body has a shoulder. The valve body defines an outside end, which opens to the ambient environment, and an inside end, which opens into the chamber. The valve includes a one-way flap that is movable between an open position to permit fluid communication between the chamber and the ambient environment through the passageway, and a closed position. The one-way flap is biased to the closed position with a closing force selected to be overcomable to move the one-way flap to the open position by an airflow having a speed that is less than about 48 m/s, and which is at a pressure lower than 1 atmosphere.

13 Claims, 12 Drawing Sheets

Related U.S. Application Data continuation of application No. 17/338,571, filed on Jun. 3, 2021, now Pat. No. 11,543,042.

(60) Provisional application No. 63/034,855, filed on Jun. 4, 2020.

(56) References Cited

U.S. PATENT DOCUMENTS

| | | | |
|---|---|---|---|
| 6,164,314 | A | 12/2000 | Saputo |
| 6,648,004 | B2 * | 11/2003 | Lau .................. F16K 15/148 137/232 |
| D492,030 | S | 6/2004 | Rani |
| 7,051,753 | B1 | 5/2006 | Caires |
| D561,329 | S | 2/2008 | McMichael |
| 7,370,653 | B2 | 5/2008 | Payne |
| 7,455,086 | B1 | 11/2008 | Elze |
| 8,181,664 | B2 * | 5/2012 | Tsai .................. F16K 15/031 137/856 |
| 8,281,799 | B2 * | 10/2012 | Lien .................. F16K 15/1825 137/232 |
| D679,589 | S | 4/2013 | Hauth |
| 8,584,695 | B2 * | 11/2013 | Lau .................. F16K 15/202 137/232 |
| 8,978,693 | B2 * | 3/2015 | Frayne .................. F16K 15/202 137/513.3 |
| D759,234 | S | 6/2016 | Bertinetti |
| 9,505,334 | B2 | 11/2016 | Maness |
| 9,618,130 | B1 | 4/2017 | Nguyen |
| D830,548 | S | 10/2018 | Kemp |
| 10,151,396 | B2 | 12/2018 | Nguyen |
| D849,195 | S | 5/2019 | Matsushita |
| D851,213 | S | 6/2019 | Matsushita |
| 10,641,403 | B2 | 5/2020 | Maxfield |
| D905,829 | S | 12/2020 | Zhang |
| 11,454,331 | B2 | 9/2022 | Correll |
| D970,691 | S | 11/2022 | Xie |
| D1,017,657 | S | 3/2024 | Skradski |
| 2006/0108556 | A1 | 5/2006 | Rose |
| 2008/0223449 | A1 | 9/2008 | Culp |
| 2009/0139582 | A1 | 6/2009 | Franta |
| 2011/0272609 | A1 | 11/2011 | Tsai |
| 2016/0223095 | A1 * | 8/2016 | Sando .................. F16K 15/205 |
| 2019/0093773 | A1 | 3/2019 | Liu |
| 2019/0184408 | A1 | 6/2019 | Tsai |
| 2020/0056711 | A1 | 2/2020 | Huang |
| 2022/0125213 | A1 | 4/2022 | Ocegueda et al. |

FOREIGN PATENT DOCUMENTS

| | | |
|---|---|---|
| CN | 105164454 A | 12/2015 |
| CN | 107101024 A | 8/2017 |
| EM | 85768700001 S | 6/2021 |

OTHER PUBLICATIONS

GB2217488.2: Examination Reports under Section 18(3) dated Jul. 17 and Oct. 14, 2024.
US Design U.S. Appl. No. 29/787,862: Exam Report and Notice of References cited dated Jan. 4, 2024.
US Design U.S. Appl. No. 29/787,862: Notice of Allowance and Notice of References cited dated Mar. 22, 2024.
US Design U.S. Appl. No. 29/787,865: Exam Report and Notice of References cited dated Feb. 14, 2024.
US Design U.S. Appl. No. 29/787,865: Exam Report and Notice of References cited dated Sep. 16, 2024.
CN 2021106473494—Search Report and Examiner's Report with English translation dated Dec. 23, 2024.

* cited by examiner

INFLATABLE OBJECT AND VALVE THEREFOR

CROSS-REFERENCE TO RELATED APPLICATIONS

This application is a continuation of U.S. patent application Ser. No. 18/148,117 filed Dec. 29, 2022; which is a continuation of U.S. patent application Ser. No. 17/338,571 filed Jun. 3, 2021, now granted as U.S. patent Ser. No. 11/543,042; which claims priority from U.S. Provisional Application No. 63/034,855 filed Jun. 4, 2020, the contents of all of which are incorporated herein by reference in their entirety.

FIELD

The specification relates generally to inflatable objects and more particularly to valves for inflatable objects.

BACKGROUND OF THE DISCLOSURE

It is known to construct inflatable objects with a valve permitting a user to manually inflate and deflate the object. Typically the valve employs some kind of one-way flow mechanism to permit air to be pushed into the object, while inhibiting air from leaving the object during between puffs by the user. These one-way flow mechanism sometimes require substantial effort to overcome, which can cause the user to tire during inflation of the object. Furthermore, the volume of air that the user needs to blow into the inflatable object can be significant and can also cause the user to become tired or dizzy. It would be advantageous to at least ameliorate one or more of these aforementioned problems or other problems with inflatable objects.

SUMMARY OF THE DISCLOSURE

In one aspect, there is provided an inflatable object which includes an inflatable object body enclosing a chamber to receive air in order to pressurize the inflatable object body, and a valve mounted to the inflatable object body. The valve includes a valve body that defines a passageway between the chamber and an ambient environment. The valve body has a shoulder. The valve body defines an outside end of the passageway, which opens to the ambient environment, and an inside end of the passageway, which opens into the chamber. The valve further includes a one-way flap that is movable between an open position in which the one-way flap permits fluid communication between the chamber and the ambient environment through the passageway, and a closed position in which the one-way flap seals against the shoulder to block fluid communication between the chamber and the ambient environment though the passageway. The one-way flap is biased to the closed position with a closing force. The closing force is selected to be overcomable so as to move the one-way flap to the open position by an airflow by a person blowing towards the one-way flap through the passageway, without having their mouth engaged with the valve body to form a seal therewith.

In one aspect, there is provided an inflatable object which includes an inflatable object body enclosing a chamber to receive air in order to pressurize the inflatable object body, and a valve mounted to the inflatable object body. The valve includes a valve body that defines a passageway between the chamber and an ambient environment. The valve body has a shoulder. The valve body defines an outside end of the passageway, which opens to the ambient environment, and an inside end of the passageway, which opens into the chamber. The valve further includes a one-way flap that is movable between an open position in which the one-way flap permits fluid communication between the chamber and the ambient environment through the passageway, and a closed position in which the one-way flap seals against the shoulder to block fluid communication between the chamber and the ambient environment though the passageway. The one-way flap is biased to the closed position with a closing force. The closing force is selected to be overcomable so as to move the one-way flap to the open position by an airflow having a speed that is less than about 48 m/s, and which is at a pressure that is lower than 1 atmosphere. The valve further includes a cover that is removably mountable on the outside end to form a cover seal against fluid communication between the chamber and the ambient environment.

In another aspect, there is provided an inflatable object which includes an inflatable object body enclosing a chamber to receive air in order to pressurize the inflatable object body, and a valve mounted to the inflatable object body. The valve includes a valve body that defines a passageway between the chamber and an ambient environment. The valve body has a shoulder. The valve further includes a one-way flap that is movable between an open position in which the one-way flap permits fluid communication between the chamber and the ambient environment through the passageway, and a closed position in which the one-way flap seals against the shoulder to block fluid communication between the chamber and the ambient environment though the passageway. The one-way flap is biased to the closed position with a closing force. The valve further includes a cover that is removably mountable on the outside end to form a cover seal against fluid communication between the chamber and the ambient environment. The cover includes a deflation projection that projects sufficiently far from a remainder of the cover to permit the cover to be inserted into the passageway to a deflation position in which the deflation projection drives the one-way flap to the open position to permit deflation of the inflatable object.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Figure 1:
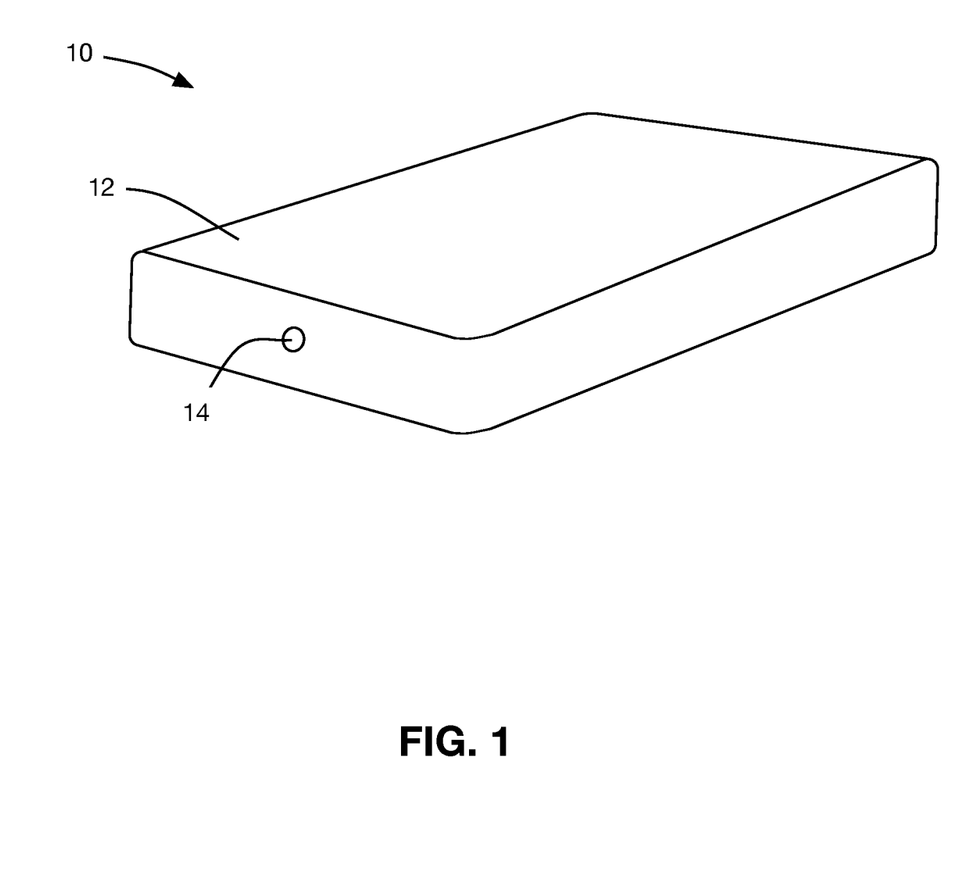
FIG. 1 shows a perspective view of an inflatable object in accordance with an embodiment of the present disclosure.

Reference is made to FIG. 1, which shows an inflatable object 10 in accordance with an embodiment of the present disclosure. The inflatable object 10 includes an inflatable object body 12, and a valve 14. The inflatable object body 12 encloses a chamber 16 for receiving air in order to pressurize the inflatable object body 12. The valve 14 is mounted to the inflatable object body 12 and includes a valve body 18, a one-way flap 20 and a cover 22. The valve body 18 (FIG. 2) defines a passageway 24 between the chamber 16 and an ambient environment 26, which is the environment outside the inflatable object 10. The passageway defines a passageway axis A shown in FIG. 6.

Figure 2:
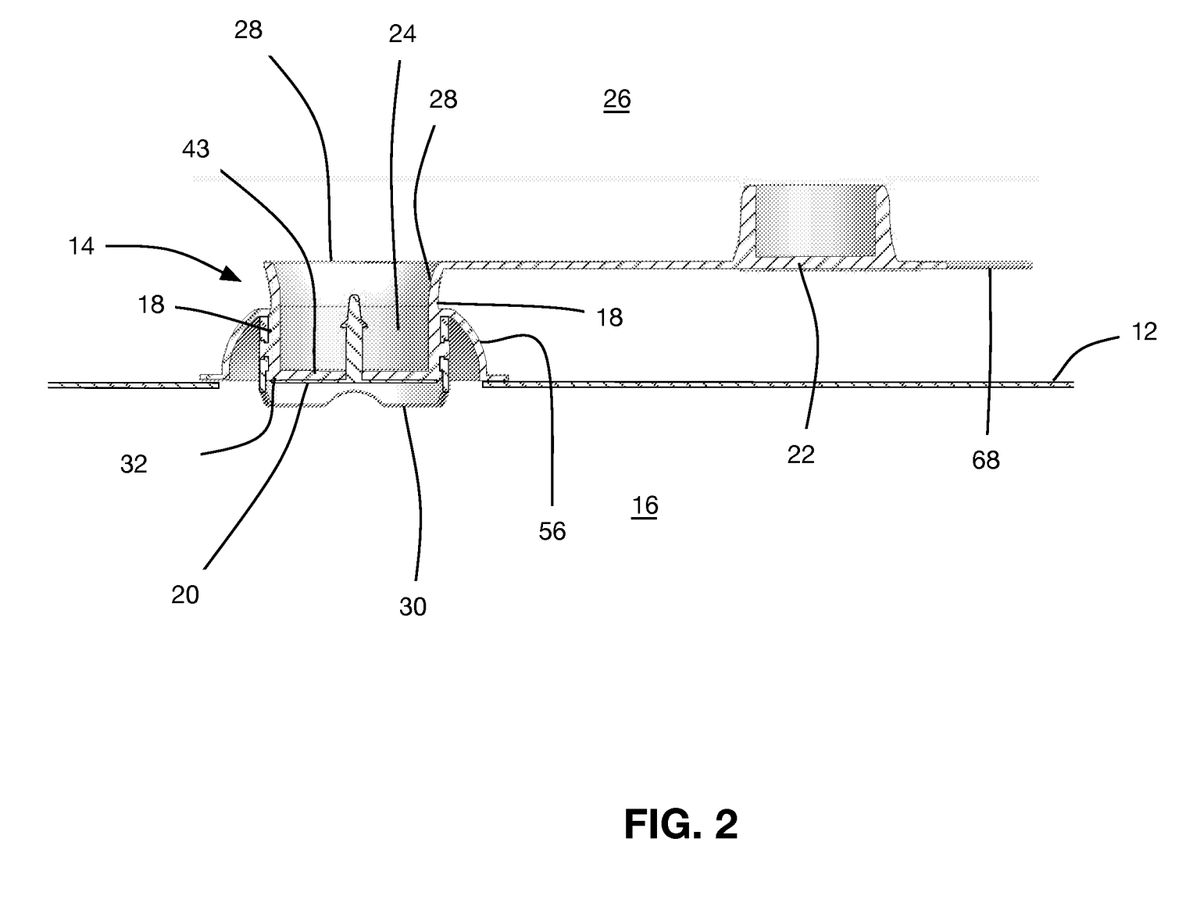
FIG. 2 is a sectional side view of a valve from the inflatable object shown in FIG. 1.

Referring to FIG. 2, the valve body 18 defines an outside end 28 of the passageway 24, which opens to the ambient environment 26, and an inside end 30 of the passageway 24, which opens into the chamber 16. The valve body 18 further includes a shoulder 32 which is a sealing surface against which the one-way flap 20 can seal. The one-way flap 20 is movable between an open position (FIG. 3A) in which the one-way flap permits fluid communication between the chamber 16 and the ambient environment 26 through the passageway 18, and a closed position (FIG. 3B) in which the one-way flap 20 seals against the shoulder 32 to block fluid communication between the chamber 16 and the ambient environment 26 though the passageway 18.

The one-way flap 20 is in at least some situations biased to the closed position with a closing force F. The closing force F is the sum total of all the forces urging the one-way flap 20 towards the closed position. This includes one or more of the following forces: 1. an air pressure P1 inside the chamber 16 that is greater than an air pressure P2 in the ambient environment 26, 2. a resiliency in the one-way flap 20 itself urging the one-way flap towards the closed position, and 3. a separate biasing member such as a spring, that urges the one-way flap 20 towards the closed position. In the example shown the one-way flap 20 is not urged to the closed position by a separate biasing member. Furthermore, in some embodiments, the one-way flap 20 lacks sufficient resiliency to urge itself to the closed position. In other words, the one-way flap 20 may be sufficiently flexible to collapse away from the closed position (i.e. to collapse in a direction away from the outside end 28 of the passageway 18) in the event that the air pressure P1 in the chamber 16 is the same as the air pressure P2 in the ambient environment 26. In the view shown in FIG. 3B, the one-way flap 20 may be held in the closed position at least in part by a pressure difference across the one-way flap 20, wherein the inside air pressure P1 is greater than the outside air pressure P2. It will be noted that, initially during the inflation process for the inflatable object 10, the closing force F urging the one-way flap 20 towards the closed position may therefore be zero.

Figure 4:
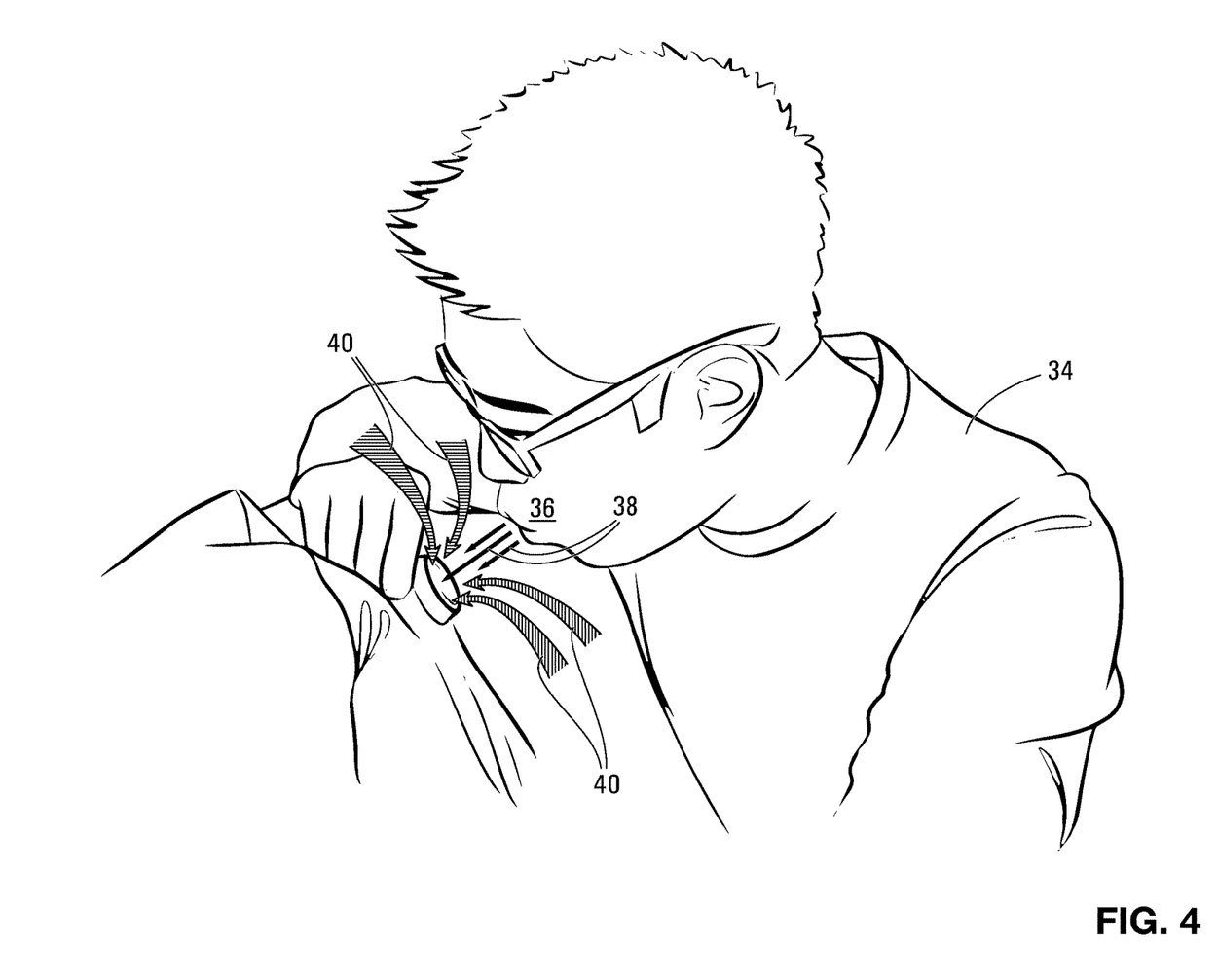
FIG. 4 is a perspective view of a user blowing up the inflatable object shown in FIG. 1 through the valve.

The closing force is selected to be sufficiently low that, during at least a first portion of the inflation process, the closing force F will be non-zero, due at least to the pressure difference between P1 and P2, but will be low enough so as to be overcomable so as to move the one-way flap to the open position by an airflow having a speed that is less than about 48 m/s, and which is at a pressure that is lower than 1 atmosphere. This provides some significant advantages over valves for inflatable objects of the prior art. One advantage is that the speed is selected such that it is possible for a person to generate an airflow having the aforementioned speed of 48 m/s. As a result, a person can, without forming a seal with their mouth around the valve 14, blow into the valve from a distance, generating an airflow having a speed that is at least 48 m/s, as shown in FIG. 4. The person (which may also be referred to as a user, and which is shown at 34) is shown holding the inflatable object 10, proximate the valve 14, and blowing into the valve 14 from a distance (i.e. such that the mouth of the user 34 (shown at 36) is spaced from the valve body 18). The airflow generated directly from the mouth 36 of the user 34 is shown by arrows 38 and may be referred to as an initial airflow 38. It will be noted that air that moves at a greater speed than the air around it, is at a lower pressure than the air around it. Thus, the pressure of the initial airflow 38 moving towards the one-way flap 20 from the mouth 36 of the user 34 is at a pressure P3 that is lower than the pressure P2 of the air in the ambient environment 26 (and is therefore definitely lower than the pressure P1 inside the chamber 16). However, even with the lower pressure of the air moving from the mouth 36 of the user 34 to the one-way flap 20, the air is moving at a speed that is sufficient to overcome the closing force F on the one-way flap 20, thereby causing the one-way flap 20 to open.

Referring still to FIG. 4, as noted above, the pressure P3 of the initial airflow 38 moving towards the one-way flap 20 is lower than the pressure P2 of the air around it in the ambient environment 26. As a result, air from the ambient environment 26 is drawn into the initial airflow 38, as represented by the arrows 40. As a result, the inlet airflow shown at 42 that enters the chamber 16 (FIG. 6) as a result of the blowing action by the user 34, is partly made up of air from the user's lungs (i.e. the initial airflow 38), and partly from air that was drawn into the airflow 38. This means that the inflatable object 10 can be inflated using some air that did not come directly from the person's lungs. This greatly facilitates the inflation process for the inflatable object 10.

Figure 3A:
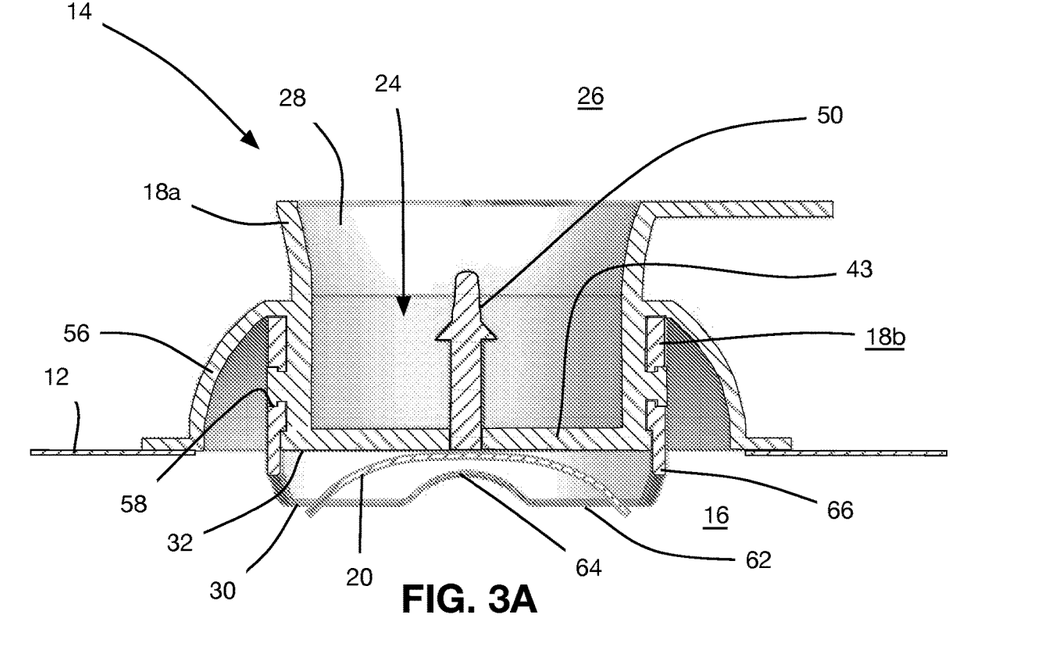
FIG. 3A is a magnified sectional side view valve shown in FIG. 2, with a one-way flap in an open position.
Figure 3B:
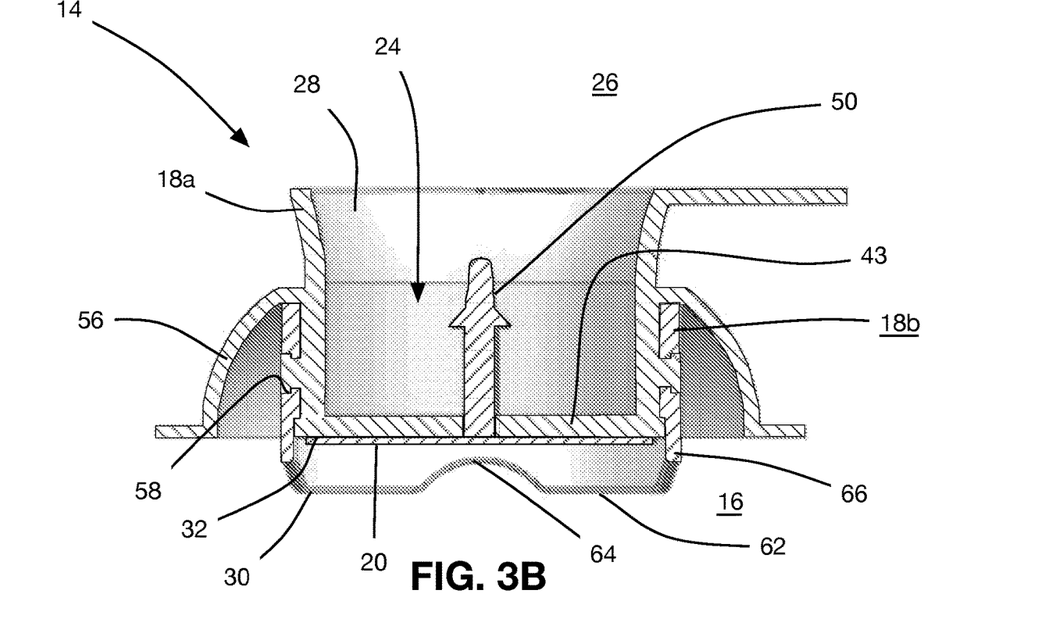
FIG. 3B is a magnified sectional side view of the valve shown in FIG. 2, with the one-way flap in a closed position.

The outside end 28 of the passageway 24 has a first cross-sectional area A1. A central region 34 of the passageway 24, which is inboard of the outside end 28 has a second cross-sectional area A2. Optionally, as shown in FIGS. 3A and 3B the outside end 28 is flared and thus, the second cross-sectional area A2 is smaller than the first cross-sectional area A1. This has been found to increase the quantity of air from the ambient environment 26 that is drawn into the airflow that engages and passes past the one-way flap 20 into the chamber 16 for each blow by a person. It is theorized that this might occur because it is possible that the reduction in the cross-sectional area of the passageway 28 as it progresses from the outside end 28 towards the one-way flap 20, leads to an increase in the speed of the airflow and a consequent further reduction in the pressure of the airflow, which draws in more air from the ambient environment 26 than would occur without the flared outside end 28.

Figure 6:
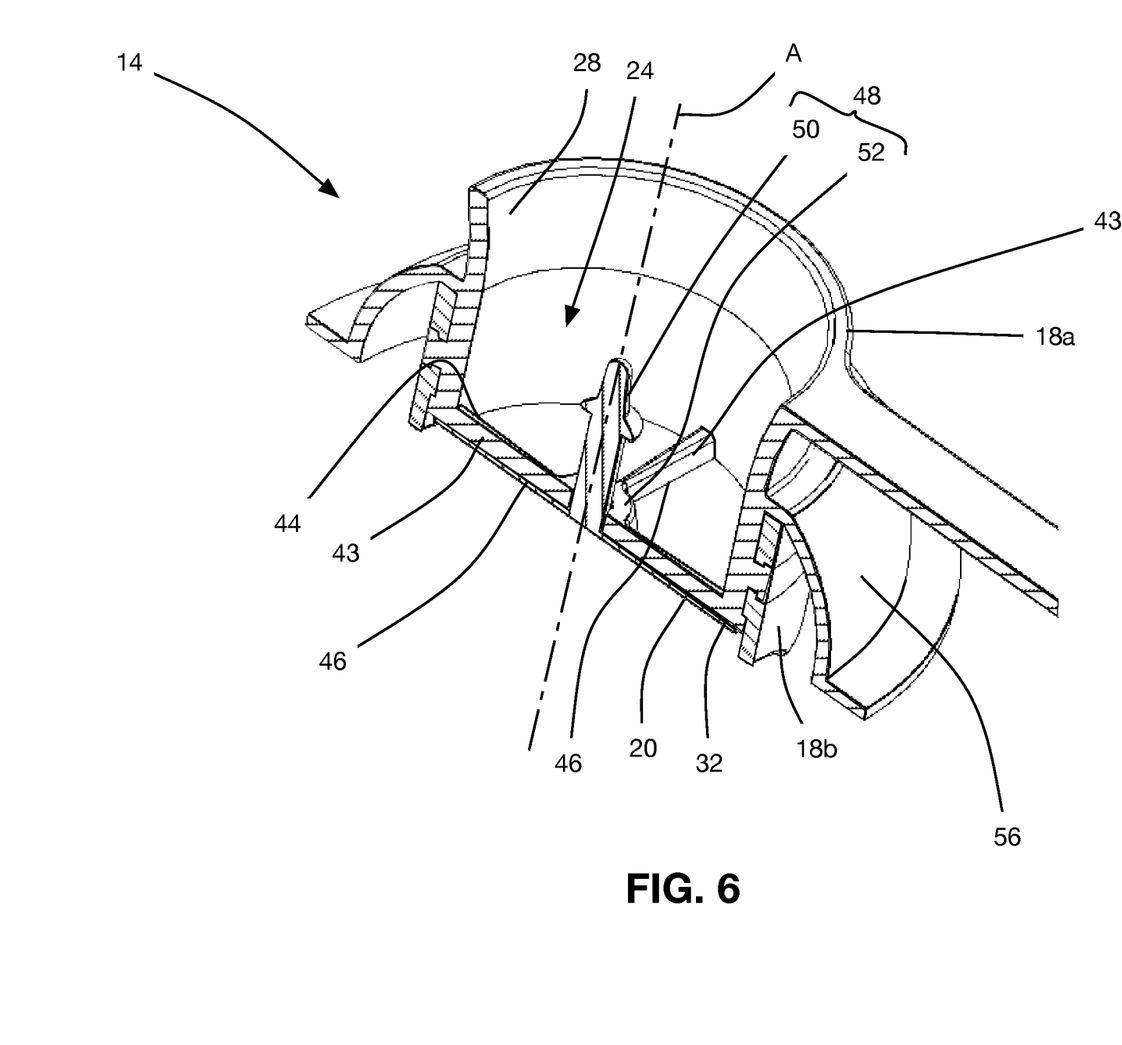
FIG. 6 is a perspective, sectional view of the valve shown in FIG. 2.

Reference is made to FIG. 6. The valve body 18 optionally includes a plurality of support ribs 43 that extend into the passageway to support the one-way flap 20 against collapse towards the outside end 28. More specifically, the one-way flap 20 may be sufficiently flexible so as to collapse towards the outside end 28 and away from the outside end 28 due to pressure differential across the one-way flap 20. However, the one-way flap is prevented from collapsing towards the outside end 28 by the plurality of support ribs 43, in order to maintain a seal against the shoulder 32.

Figure 7:
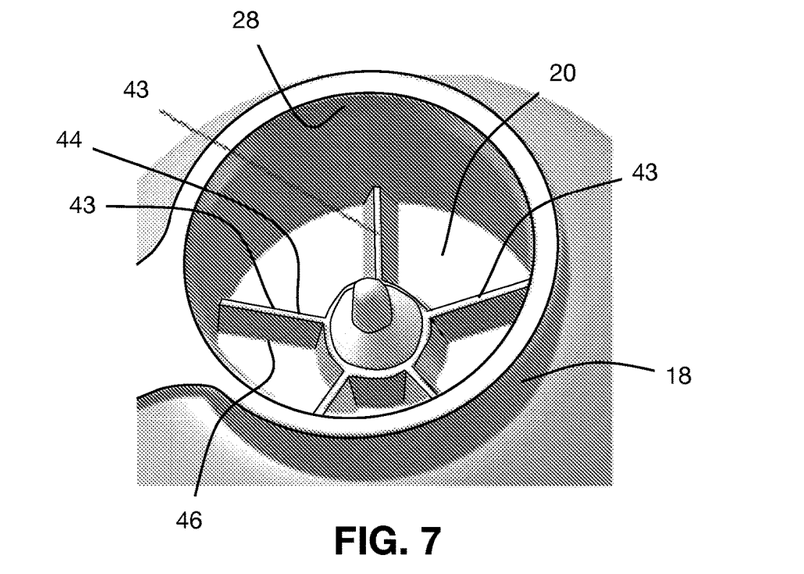
FIG. 7 is a perspective view from an outside end of a variant of the valve shown in FIG. 2.

Each of the plurality of support ribs 43 has a first side 44 facing the outside end 28 of the passageway 24 and a second side 46 facing away from the outside end 28 of the passageway 24. As shown somewhat in FIG. 6, and more strongly in the variant shown in FIG. 7, each of the plurality of support ribs 43 may be tapered from the second side 46 towards the first side 44. This reduces the pressure drop incurred by the inlet airflow 42 as it passes the support ribs 43.

As noted above, the one-way flap 20 may be a flexible polymeric flap that is resilient and is biased towards the closed position due to its resiliency, or that is sufficiently flexible that, at equal pressure across the one-way flap 20, the one-way flap 20 collapses away from the outside end 28. The one-way flap 20 may be made from any suitable material, such as, for example, silicone.

The one-way flap 20 may be connected to the valve body 18 in any suitable way. For example, in the embodiment shown in FIGS. 3A and 3B, the one-way flap 20 is connected to the valve body 18 at a connecting structure 48 (best seen in FIG. 6) that is centered in the passageway 24. The connecting structure 48 may include a one-way flap post 50 that extends through a central annulus 52 that connects the plurality of support ribs 43 to one another. The one-way flap post 50 may be frictionally engaged with the inner face of the annulus, or may be connected more fixedly via an adhesive or any other suitable means.

Optionally, a collar 56 is provided and extends between the inflatable object body 12 and the valve body 18. The collar 56 is movable between an extended position (FIGS. 3A, 3B, 5) in which the collar 56 holds the valve body 18 such that the outside end 28 of the passageway 24 projects outward from the inflatable object body 12, and a retracted position (FIG. 9) in which the collar 56 holds the valve body 18 such that the outside end 28 of the passageway 24 is positioned closer to the inflatable object body 12 than when the collar 56 is in the extended position. For example, when the collar 56 is in the retracted position, the outside end 28 may be generally flush with the inflatable object body 12. The collar 56 is resilient and is stable in both the extended and retracted positions, and may optionally be (but does not need to be) biased towards one of the extended and retracted positions when the collar 56 is positioned between the extended and retracted positions.

The collar 56 may be connected to the inflatable object body 12 in any suitable way such as by thermal welding or by a suitable adhesive.

Optionally, the valve body 18 includes a valve body main portion 18a and a reinforcement member 18b. The valve body main portion 18a is made of a first material having a first hardness. For example, the valve body 18a may be made from a polymeric material that is easily deformable manually by a person, such as a soft PVC. The valve body main portion 18a may be contiguous with the collar 56.

The reinforcement member 18b is made from a second material that has a second hardness that is greater than the first hardness. The reinforcement member 18b may, for example, be made from a rigid polymeric material, such as a rigid PVC. The reinforcement member 18b is connected to the valve body main portion 18a so as to reinforce the valve body main portion 18a. The connection to the valve body main portion 18a may be by any suitable means. For example, the reinforcement member 18b may include connection aperture 58 and the valve body 18a may be overmolded through the connection apertures 58 or may include premolded projections that engage the connection apertures 58. In embodiments in which the valve body main portion 18a is not overmolded onto the reinforcement member 18b glue may be used to hold the two elements to one another securely.

Figure 5:
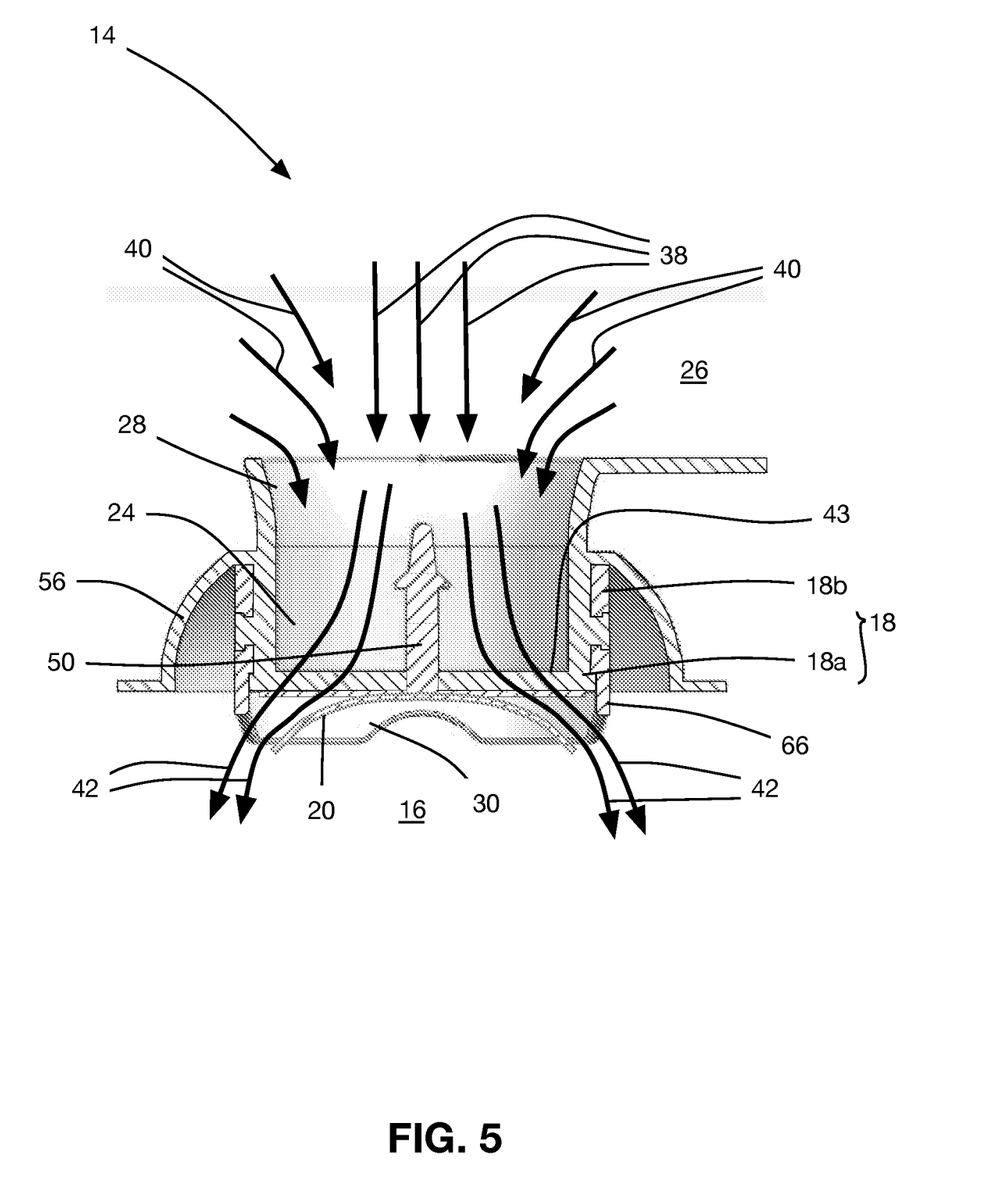
FIG. 5 is a magnified side view the valve shown in FIG. 2, illustrating the flow of air into the inflatable object.

In the embodiment shown in FIG. 5, it can be seen that the inside end 30 of the passageway 24 has an inside end edge 60, which has a plurality of peaks 62 and valleys 64, where at least the peaks 62 extend further inwardly relative to the one-way flap 20. It has been found that the peaks 62 and the valleys 64 facilitate movement of the one-way flap 20 to the closed position. More specifically, the valleys 64 facilitate the flow of air into the chamber 16 even when the one-way flap 20 is only open by a small amount, while the peaks 62 help to protect the one-way flap 20 from mechanical damage. Furthermore, it can be seen that the inside end edge 60 is formed on the reinforcement member 18*b*, so that it can be more effective at protecting the one-way flap 20 from damage than if it were defined on the valve body main portion 18*a* which is softer than the reinforcement member 18*b*. It will also be noted that the peaks 62 and valleys 64 permit the one-way flap 20 to open and close to permit air to flow into (or out of) the chamber 16, even if the inside end 30 of the passageway 24 wound up abutted against a wall of the inflatable object body 12 inside the chamber 16.

The portion of the valve body 18 that extends into the chamber 16 axially past the one-way flap 20 (when the one-way flap 20 is in the closed position) may be referred to as an extension portion 66. Thus, the peaks 62 and valleys 64, and the inside end edge 60 are on the extension portion 66.

Figure 14:
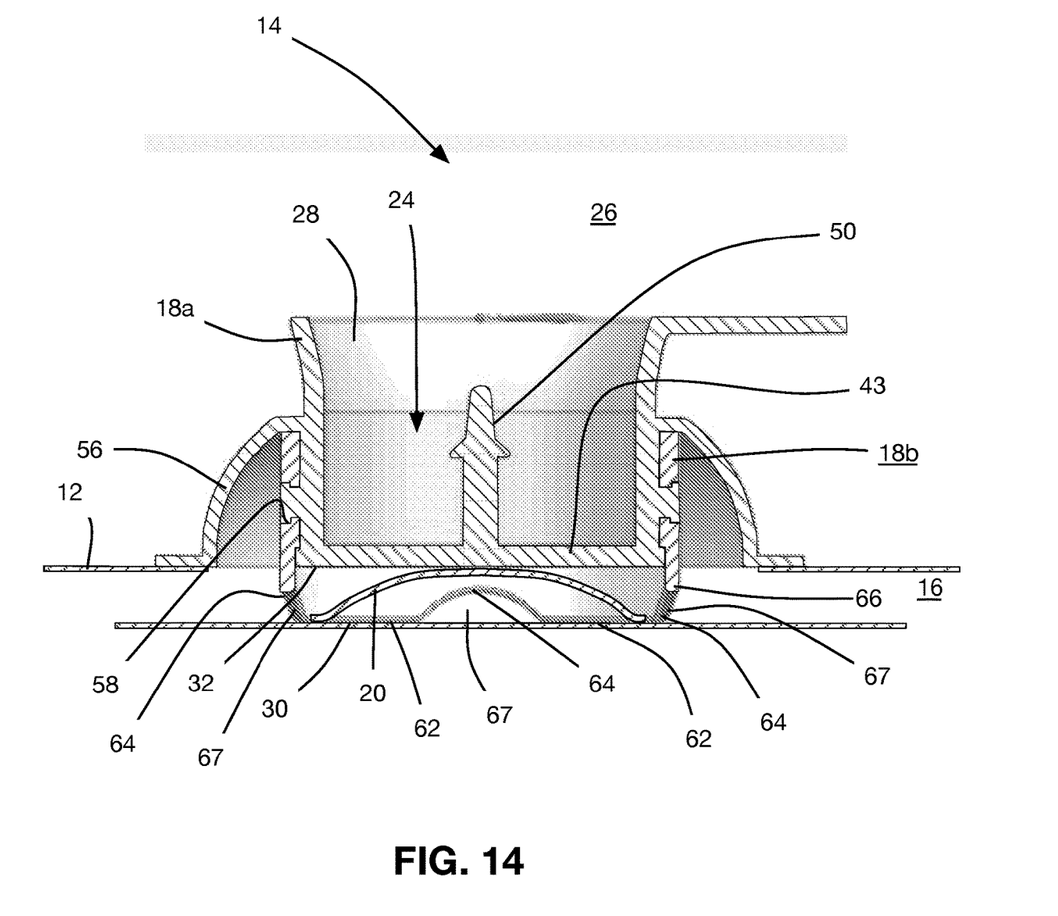
FIG. 14 is a magnified sectional side view of the valve shown in FIG. 2, showing an extension portion that is engaged with a wall of an inflatable object body of the inflatable object shown in FIG. 1.

FIG. 14 shows an example of such a case, where the inside end 30 of the passageway 24 is abutted directly against a wall shown at 65 of the inflatable object body 12. As can be seen, the extension portion 66 permits the one-way flap 20 to move to the open position, and the peaks 62 and valleys 64 cooperate to define a plurality of air apertures 67 for air to pass into the chamber 16 (or out of the chamber 16) when the one-way flap 20 is in the open position (which is shown in FIG. 14).

Thus it may be said that the valve body 18 has an extension portion 66 which extends into the chamber 16 past the one-way flap 20 and which has a plurality of projections 62 and valleys 64 which define a plurality of air apertures 67 so as to permit movement of the one-way flap 20 to the open position, so as to permit air to flow into the chamber 16 in the event that the inside end 30 of the passageway 24 is engaged with a wall 67 of the inflatable object body 18 inside the chamber.

Figure 9:
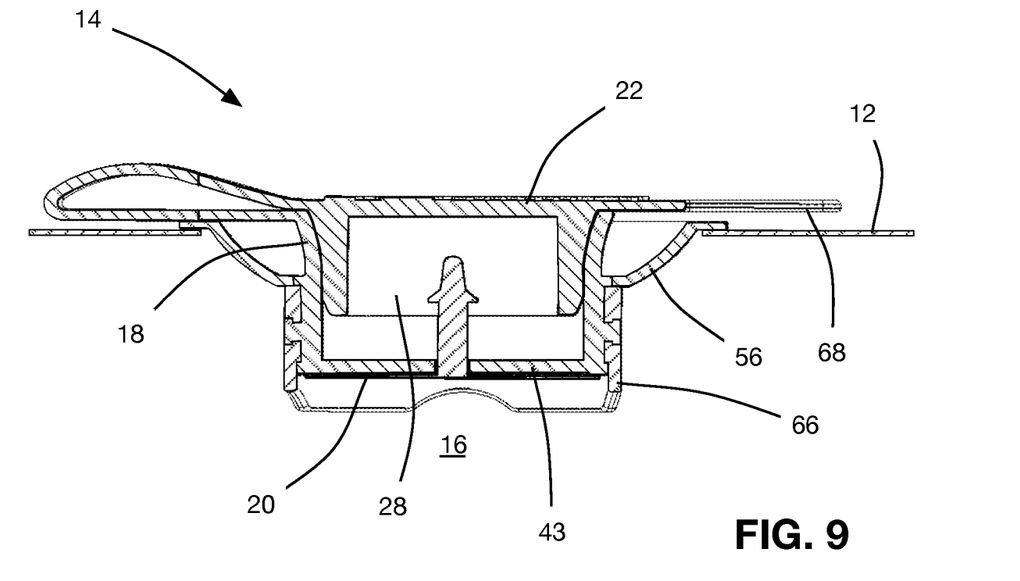
FIG. 9 is a magnified sectional side view of the valve shown in FIG. 2 with a cover in a closed position.

Referring to FIG. 9, the cover 22 is removably mountable on the outside end 28 of the passageway 24, to form a cover seal against fluid communication between the chamber 16 and the ambient environment 26. In embodiments where the one-way flap 20 is very soft and collapses when exposed to equal pressure across it, the seal formed by the cover 22 becomes the only seal holding air in the chamber 16. In embodiments where the one-way flap 20 is sufficiently resilient or is urged by an external spring or the like to the closed, the seal formed by the cover 22 cooperates with the seal formed by the one-way flap 20 to hold air in the chamber 16.

Figure 8:
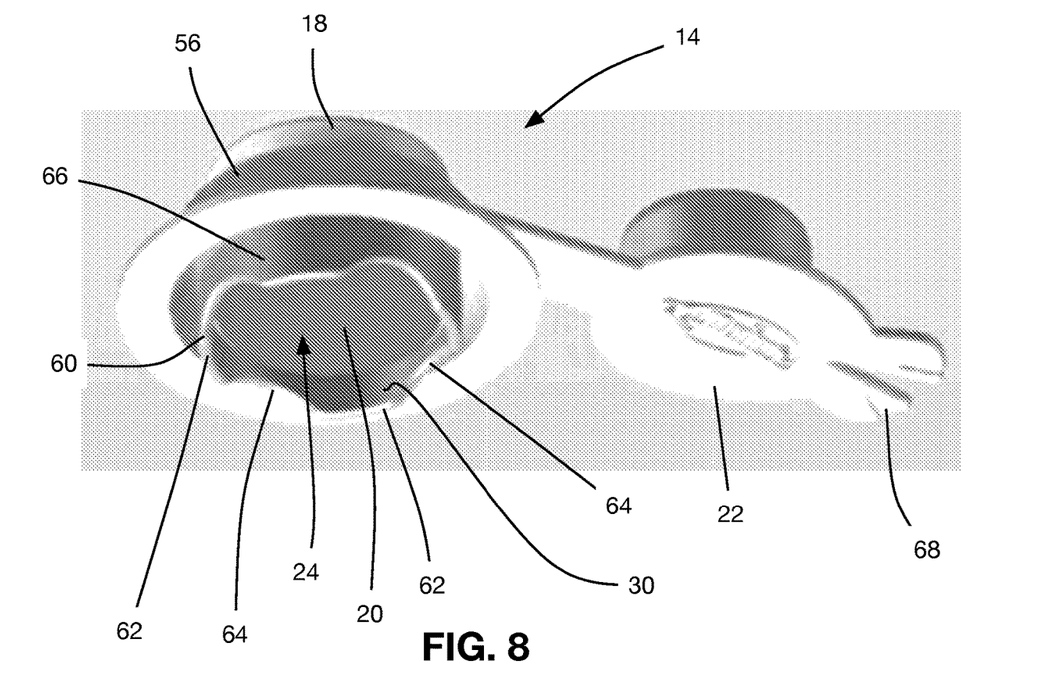
FIG. 8 is a perspective view from an inside end of the valve shown in FIG. 2.
Figure 10:
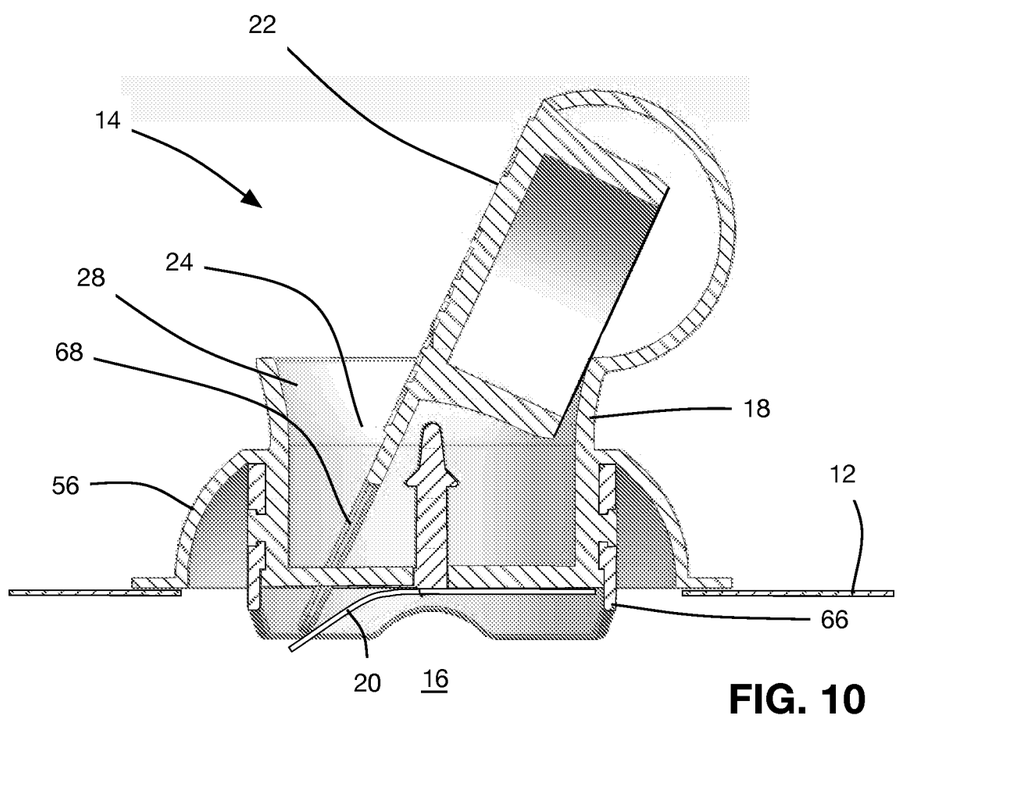
FIG. 10 is a magnified sectional side view of the valve shown in FIG. 2 with the cover in a deflation position.

When a user 34 wishes to fill the chamber 16, they may pull the valve 14 out and open the cover 22 so that the valve 14 is in the position shown in FIG. 2. The user 34 may spread out the inflatable object body 12 so that it is ready to receive air. The user 34 may then blow towards the valve 14 as shown in FIG. 4, thereby filling the chamber 16 with air from the user's lungs and with air from the ambient environment 26. As air enters the chamber 16 and pressurizes the chamber 16 by a small amount, the one-way flap 20 is moved by the differential pressure thereacross to the closed position if it was collapsed. Further blowing by the user 34 further fills the chamber 16 with air as described above. Eventually, the pressure P2 in the chamber 16 is high enough that the speed of the initial airflow 38 generated by the user 34 is not high enough to open the one-way flap 20. As this point, the chamber 16 has a significant amount of air in it, and may be very close to full. The user 34 then may form a seal with their mouth 36 around the outside end 28 of the valve body 18 and blow into the chamber 16 using pressure from their lungs instead of using the speed of the air. Once the chamber 16 is full, the user 34 may then close the cover 22 on the outside end 28 of the valve body 18, and may push the valve 14 inwardly so that the collar 56 moves to the retracted position. When it is desired to open and deflate the inflatable object 10, the user 34 may open the cover 22 and may mechanically push the one-way flap 20, if necessary, to break its seal with the shoulder 32. The user 34 may hold the one-way flap 20 in this open position all the while the chamber 16 is deflating. To assist the user in deflating the chamber 16, the cover 22 may optionally include a deflation projection 68 that projects sufficiently far from a remainder of the cover 22 to permit the cover 22 to be inserted into the passageway 28 to a deflation position shown in FIG. 10, in which the deflation projection 68 drives the one-way flap 20 to the open position to permit deflation of the inflatable object 10. As shown in FIG. 8, the valve 14 may include a plurality of deflation projections 68 that are positioned to permit a pass-through of one of the support ribs 43 therebetween, so that the deflation projections 68 can engage the one-way flap 20 on either side of one of the support ribs 43.

Figure 11A:
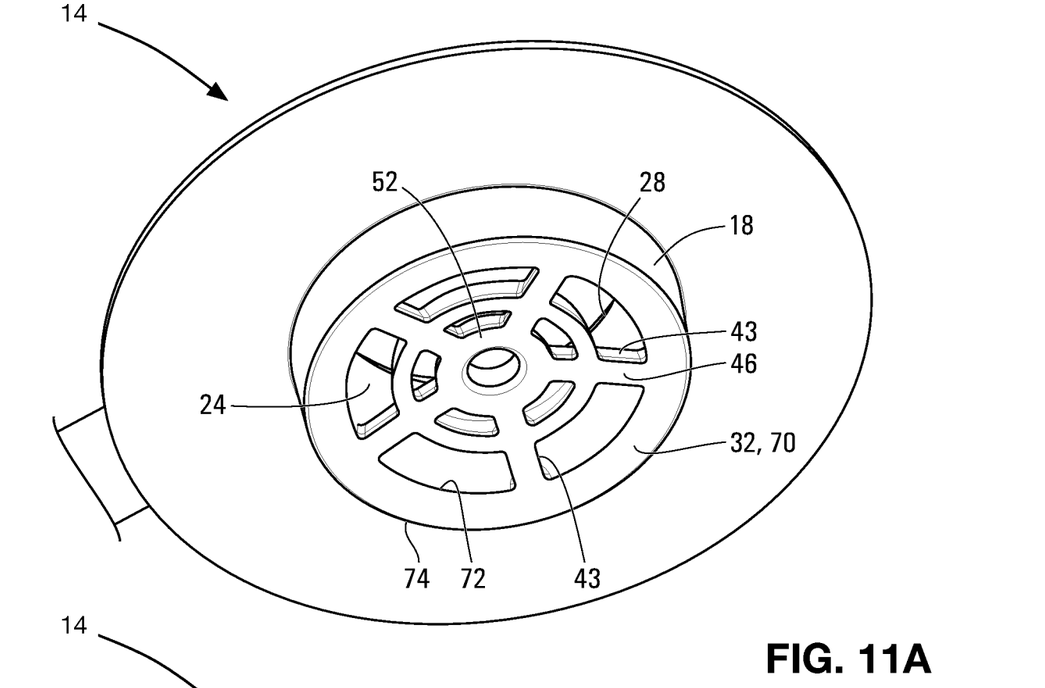
FIG. 11A is a perspective view of a variant of the valve shown in FIG. 2, in which a shoulder on the valve forms a depression for engagement by the one-way flap shown in FIGS. 3A and 3B.
Figure 11B:
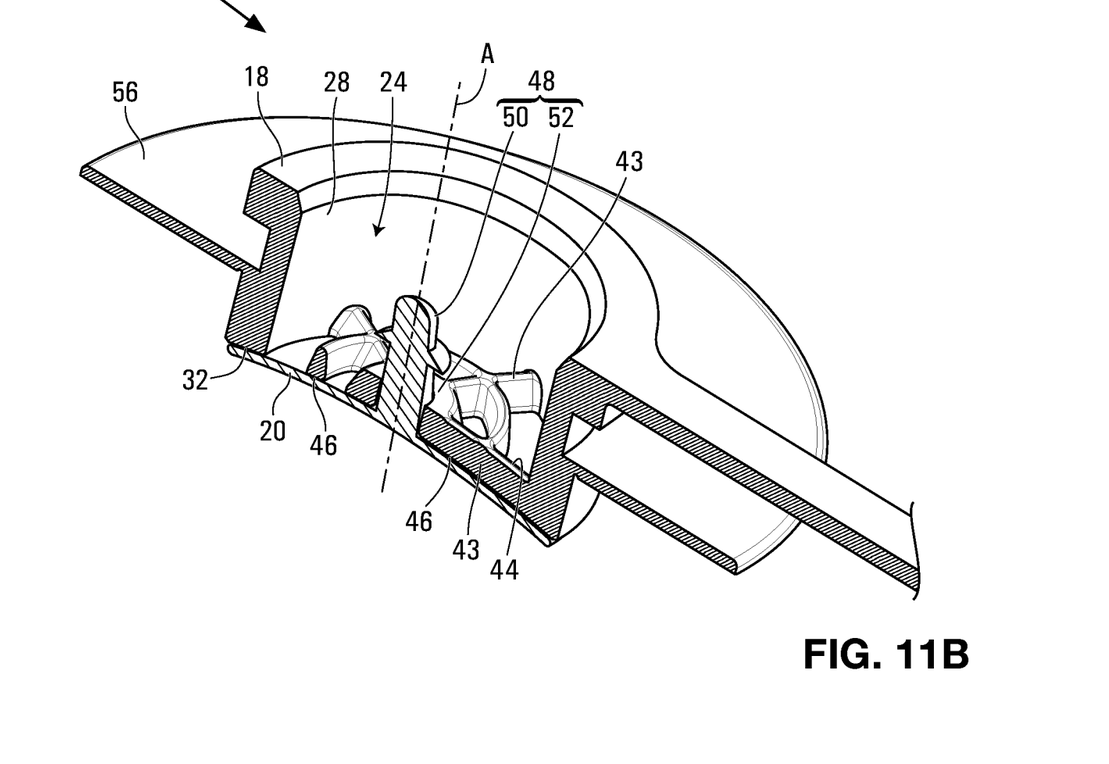
FIG. 11B is a sectional perspective view of the variant of the valve shown in FIG. 11A, showing the one-way flap in the depression.

Reference is made to FIGS. 11A and 11B, which show an alternative embodiment of the valve 14. The one-way flap 20 is not in FIG. 11A, but is shown in FIG. 11B. In the embodiment shown in FIGS. 11A and 11B, the shoulder 32 may optionally be in the form of a depression 70, such that a radially inner edge (shown at 72) of the shoulder 32 is closer to the outside end 28 of the passageway 24 than is a radially outer edge shown at 74 of the shoulder 32. By forming the depression, the one-way flap 20 more easily moves between its open and closed positions and may be more prone to forming a good seal because the one-way flap 20 is always, whether in the open or closed positions, in a state of curvature in a certain direction. In the embodiment shown in FIGS. 11A and 11B, the one-way flap 20 is curved away from the outside end 28, i.e. it is curved in the direction it would be curved during the movement of air into the inflatable member 10.

As shown in FIGS. 11A and 11B, the second side 46 of the support ribs 43 cooperate with the shoulder 32 to form the depression 70. This further ensures that the one-way flap 20 remains always in a state where it is curved by some amount away from the outside end 28.

It can be seen that, in the embodiments shown in FIGS. 11A and 11B, the valve 14 lacks an extension portion 66. It will be noted, however, that an extension portion could be provided with the valve 14 shown in FIGS. 11A and 11B.

Figure 12:
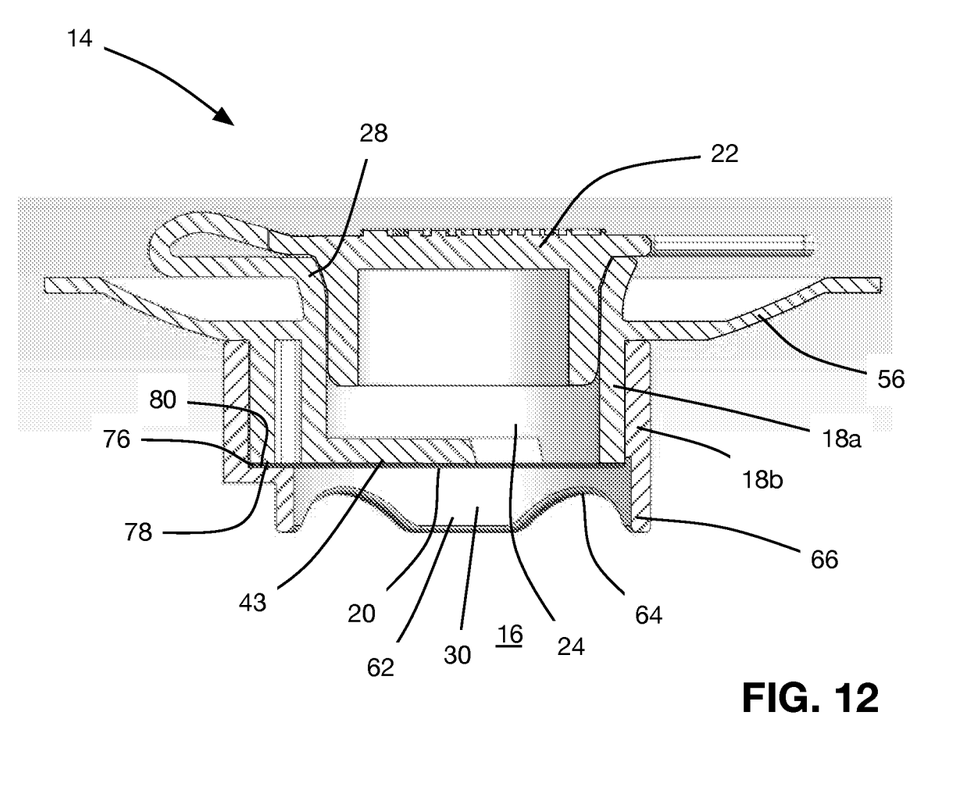
FIG. 12 is a magnified sectional side view of the valve shown in FIG. 2 with a variant of a connecting structure that holds the one-way flap to a valve body.

Reference is made to FIG. 12. In an alternative embodiment, the connecting structure 48 is not formed by a one-way flap post that is positioned in the passageway 24, but is instead outboard from a radial edge of the passageway 24. As a result, the connecting structure 48 shown in FIG. 12 interferes less with the flow of air into the chamber 16. In the embodiment shown, the connecting structure 48 includes a flap extension 76 that extends radially outward from a remainder of the one-way flap 20 and is pinched (i.e. clamped) between an edge face 78 of the valve body main portion 18*a*, and a pinch surface 80 on the reinforcement member 18*b*.

This arrangement in FIG. 12 may also be advantageous in that the one-way flap 20 is only held in cantilever at its outermost edge, and is therefore free to flex along a length that extends across its entire diameter. By contrast, the one-way flap 20 shown in FIG. 3B for example, flexes along half of this length, since it is supported in its middle. Accordingly, the one-way flap 20 in FIG. 12 may be easier to move to the open position than the one-way flap 20 shown in FIG. 3B, thereby further reducing the minimum air speed needed to cause the one-way flap 20 to move to the open position.

Figure 13A:
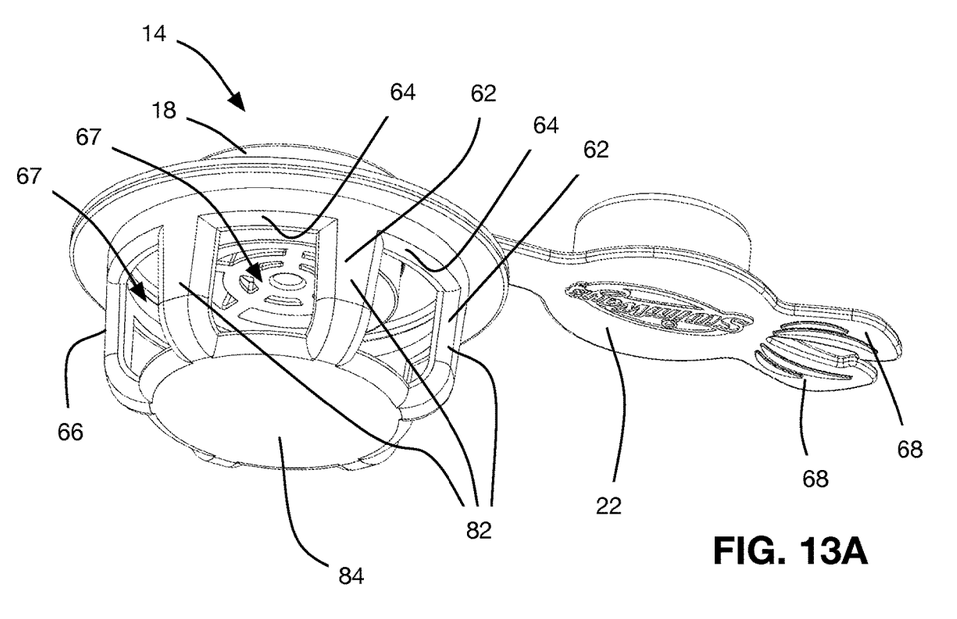
FIG. 13A is a perspective view of another variant of the valve shown in FIG. 2.
Figure 13B:
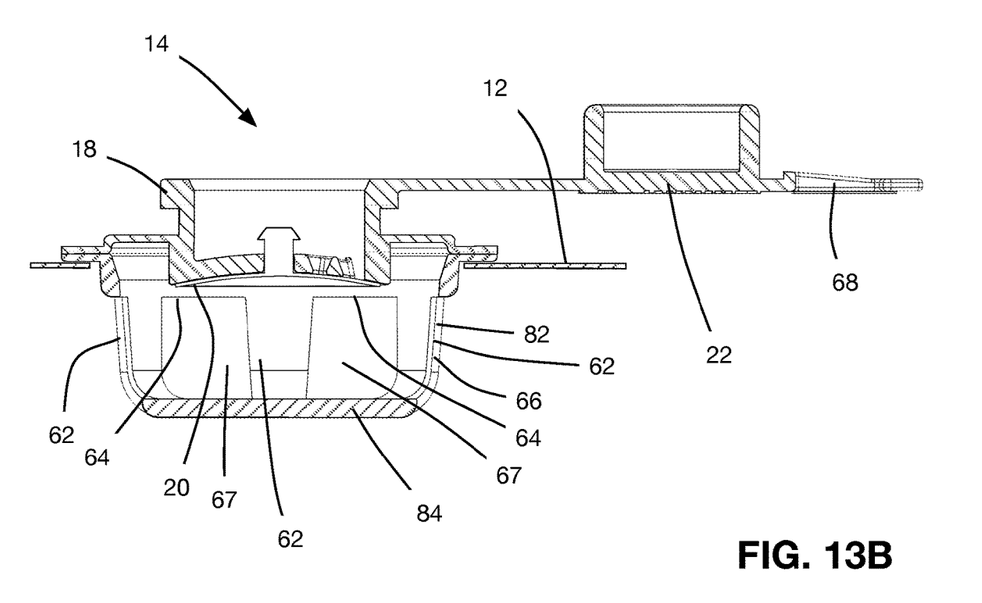
FIG. 13B is a sectional side view of the variant of the valve shown in FIG. 13A.

Reference is made to FIGS. 13A and 13B, which show another embodiment of the valve 14. In the embodiment shown in FIGS. 13A and 13B, the valve 14 includes an extension portion 66 that includes an axially extending portion 82 and a radially extending portion 84, in contrast to the embodiment shown in FIGS. 3A and 3B, in which the extension portion 66 only extends axially and does not have a radially extending portion. The axially extending portion 82 can be said to include peaks 62 and valleys 64, which define air apertures 67. The radially extending portion 84 overlaps at least partially radially with the one-way flap 20, as can be seen particularly in FIG. 13B. The axially extending portion 82 has the aforementioned advantages provided by the extension portion 66 shown in FIGS. 3A and 3B. However, it is possible for a localized projection that could exist in the wall 67 of the inflatable object body 12 to enter into the extension member 66 and to obstruct the opening of the one-way flap 20 during use of the valve 14 (e.g. when inflating the inflatable object 10), or to enter into the extension portion 66 and damage the one-way flap 20. For example, if the wall 67 of the inflatable object body 12 is folded and piled in a certain, it could on its own form such a projection. In another example, if the inflatable object body 12 is sitting, uninflated, on ground having a localized projection underneath the wall 67, the wall 67 would form a localized projection simply lying on the localized projection on the ground under it. By providing the radially extending portion 84, the radially extending portion 84 provides additional protection to prevent localized projections inside the chamber 16 from entering into extension portion 66 and obstructing or damaging the one-way flap 20.

While a speed of 48 m/s has been described, it is not necessarily a strict limitation. It will be understood by one skilled in the art that the one-way flap 20 is constructed (in at least some embodiments) to be movable to the open position (i.e. to be overcomable) by a person blowing towards it without having their mouth engaged with the valve body 18 to form a seal therewith.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. An inflatable object, comprising:
an inflatable object body enclosing a chamber to receive air in order to pressurize the inflatable object body; and
a valve mounted to the inflatable object body, the valve including
a valve body that defines a passageway between the chamber and an ambient environment, the valve body having a shoulder, wherein the valve body defines an outside end of the passageway, which opens to the ambient environment, and an inside end of the passageway, which opens into the chamber,
a one-way flap that is movable between an open position in which the one-way flap permits fluid communication between the chamber and the ambient environment through the passageway, and a closed position in which the one-way flap seals against the shoulder to block fluid communication between the chamber and the ambient environment though the passageway, wherein the one-way flap is biased to the closed position with a closing force, wherein the closing force is selected to be overcomable so as to move the one-way flap to the open position by an airflow having a speed that is less than about 48 m/s, and which is at a pressure that is lower than 1 atmosphere, and
a cover that is removably mountable on the outside end to form a cover seal against fluid communication between the chamber and the ambient environment,
wherein the valve body includes a plurality of radial support ribs that extend into the passageway to support the one-way flap against collapse towards the outside end, wherein adjacent pairs of radial support ribs are separated by an opening, wherein the valve body further includes a plurality of circumferential support ribs that extend across the opening between each adjacent pair of radial support ribs so as to separate each opening into a radially extending series of opening portions between each pair of radial support ribs, wherein the one-way flap is sufficiently flexible so as to collapse towards the outside end and away from the outside end due to pressure differential across the one-way flap, but is prevented from collapsing towards the outside end in order to maintain a seal against the shoulder, due to the plurality of radial support ribs.

2. An inflatable object as claimed in claim 1, wherein the outside end has a first cross-sectional area, and a central region that is inboard of the outside end and which has a second cross-sectional area that is smaller than the first cross-sectional area.

3. An inflatable object as claimed in claim 1, wherein the one-way flap is connected to the valve body at a connecting structure that is centered in the passageway.

4. An inflatable object as claimed in claim 1, wherein the one-way flap is connected to the valve body at a connecting structure that is outboard from a radial edge of the passageway.

5. An inflatable object as claimed in claim 1, wherein each of the plurality of radial support ribs and circumferential support ribs has a first side facing the outside end of the passageway and a second side facing away from the outside end of the passageway, and wherein each of the plurality of radial support ribs and circumferential support ribs is tapered from the second side towards the first side.

6. An inflatable object as claimed in claim 1, wherein the cover includes a deflation projection that projects sufficiently far from a remainder of the cover to permit the cover to be inserted into the passageway to a deflation position in which the deflation projection drives the one-way flap to the open position to permit deflation of the inflatable object.

7. An inflatable object as claimed in claim 1, further comprising a collar that extends between the inflatable object body and the valve body, and is movable between an extended position in which the collar holds the valve body such that the outside end of the passageway projects outward from the inflatable object body, and a retracted position in which the collar holds the valve body such that the outside end of the passageway is positioned closer to the inflatable object body than when the collar is in the extended position, wherein the collar is resilient and is stable in both the extended and retracted positions and is biased towards one of the extended and retracted positions when the collar is positioned between the extended and retracted positions.

8. An inflatable object as claimed in claim 7, wherein the valve body includes a valve body main portion that is made of a first material having a first hardness, wherein the valve body main portion is contiguous with the collar, and the valve body further includes a reinforcement member that is made from a second material that has a second hardness that is greater than the first hardness, wherein the reinforcement member is connected to the valve body main portion so as to reinforce the valve body main portion.

9. An inflatable object as claimed in claim 8, wherein the one-way flap is clamped between a first clamping surface on the valve body main portion and a second clamping surface on the reinforcement member.

10. An inflatable object as claimed in claim 1, wherein the valve body has an extension portion which extends into the chamber past the one-way flap and which has a plurality of projections and valleys which define a plurality of air apertures so as to permit movement of the one-way flap to the open position, so as to permit air to flow into the chamber in the event that the inside end of the passageway is engaged with a wall of the inflatable object body inside the chamber.

11. An inflatable object as claimed in claim 10, wherein the extension portion includes an axially extending portion that includes the projections and valleys and further includes a radially extending portion that at least partially overlaps radially with the one-way flap.

12. An inflatable object as claimed in claim 1, wherein, the one-way flap is sufficiently flexible that, at equal pressure across the one-way flap, the one-way flap collapses away from the outside end.

13. An inflatable object as claimed in claim 1, wherein the shoulder is in the form of a depression, such that a radially inner edge of the shoulder is closer to the outside end of the passageway than is a radially outer edge of the shoulder.

\* \* \* \* \*